April 15, 1952     D. C. ROCKOLA     2,593,191

PARKING METER

Filed Dec. 5, 1945     5 Sheets-Sheet 1

Inventor:
David C. Rockola

Inventor:
David C. Rockola

April 15, 1952 — D. C. ROCKOLA — 2,593,191
PARKING METER
Filed Dec. 5, 1945

Inventor:
David C. Rockola

Inventor
David C. Rockola

Patented Apr. 15, 1952

2,593,191

UNITED STATES PATENT OFFICE 2,593,191

PARKING METER

David C. Rockola, Chicago, Ill., assignor, by mesne assignments, to The Rock-Ola Manufacturing Corporation, Chicago, Ill., a corporation of Delaware Application December 5, 1945, Serial No. 632,901

17 Claims. (Cl. 194—1)

This invention relates to improvements in parking meters.

One object of the invention is to provide a parking meter that is automatic in operation, that is, one that requires no operation of a knob, lever or other actuating member by a patron to set the time measuring and indicating mechanism in operation. In the present improved meter, the insertion of a coin releases the time measuring elements of the meter for operation, effects the setting of an indicator in position to indicate the beginning of a parking period of a duration determined by the value or size of the inserted coin and upon the expiration of that period (if no coin is thereafter inserted to extend the original parking period) stops the time measuring mechanism and makes visible a warning signal that indicates the termination of the parking period. A vehicle in the metered space, when the warning signal is visible, indicates that the motorist has overstayed the paid-for parking period or did not insert a coin originally.

Another object of the invention is to provide a mechanism comprising a signal member that is automatically operated by the meter mechanism from a position indicating expiration of a parking period (overparking or non-payment) to a position indicating the beginning of the parking period. The signal member preferably is visible from the forward and also the rear side of the meter.

An additional object of the invention is to provide a parking meter adapted to be set in operation automatically for timing parking periods upon the insertion of a coin or of a plurality of coins which may be of different sizes or denominations or values for effecting actuation of the meter for a period correlative to the value or values of the inserted coins. For example, a meter adapted to accord a 60 minute parking period upon the insertion of a 5¢ piece will accord a 12 minute parking period for each 1¢ piece inserted, the latter periods being accumulative whereby insertion in succession of 1, 2, 3, 4 or 5 one-cent pieces effects setting of the indicator to indicate parking periods of 12, 24, 36, 48 or of 60 minutes duration respectively.

Another object of the invention is to provide means operable by a power unit such as a clock mechanism, not only for timing the parking periods and indicating the lapse of time during such periods, but to provide controls whereby said means is rendered operative upon insertion of a coin to thereupon actuate a signal from a non-operating to an operating or pay-indicating position and which means effects also reverse movement of the signal member upon the termination of a parking period and arrests operation of the power unit.

Another object of the invention is to provide a parking meter having transmission mechanism for varying the duration of the parking periods indicated by the movement of an indicator through pre-determined distances whereby the improved meter is adapted for indicating parking periods of different durations by the mere substitution of the dial or dials associated with the indicator. Thus the improved meter may be adjusted to afford a 60 minute maximum period as well as periods of 12 minutes duration or, by a shifting of the transmission, the meter can be set to give 30 minute or 90 minute maximum parking periods and short or fractional periods of 6 or 18 minutes respectively, for example.

A further object of the invention is to provide, in an automatic meter, means responsive to the diameter (and hence to the denomination or value) of inserted coins and whereby not only is a parking period accorded the motorist which is correlative to the value of the coin or coins inserted but which meter comprises mechanism whereby the insertion of a proper coin or coins initiates the operation of the meter from a non-operating condition (if the meter is at rest when the said coin is inserted) but which automatically effects visual display of the last inserted coin for the purpose of discouraging the use of spurious coins or unauthorized slugs.

Other objects of the invention relate to various features of construction and arrangement of parts which will be apparent from consideration of the following specification and accompanying drawings, wherein:

Figure 4:
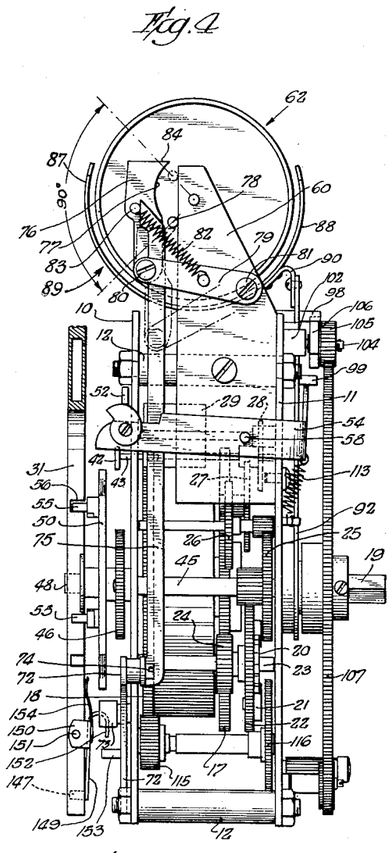
Fig. 4 is an end elevation of the mechanism looking to the left in Fig. 1.
Figure 5:
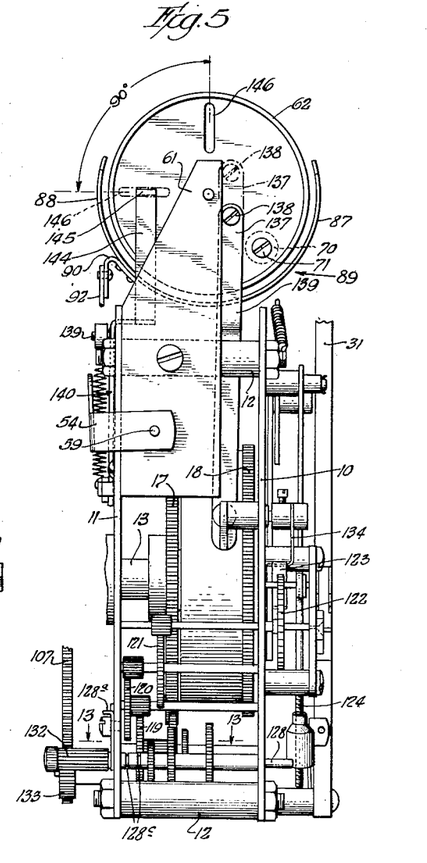
Fig. 5 is an end elevation looking to the right in Fig. 1.
Figure 6:
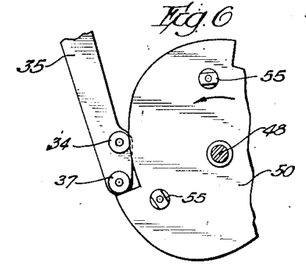
Fig. 6 is a fragmentary front elevation of a cam and associated coin-actuated lever.

The parking meter mechanism selected for the purpose of illustrating the invention, comprises a frame having a forward plate 10 and a rear plate 11 which are vertically arranged and which are spaced apart as shown in Figs. 4 and 5 by spacing members 12 at each corner of the plates.

Mounted upon a cylindrical shaft 13 which is journalled in the plates 10 and 11 is a power unit indicated generally by the numeral 14. The power unit shown comprises a clock spring 15, the inner end of which is secured to the shaft 13 while the outer end is secured to an enclosing drum 16. Secured to the shaft 13 for actuation thereby in a clockwise direction as viewed from the front of the meter is a driving gear 17, while secured to the drum 16 and operable therewith in the opposite or counter-clockwise direction as viewed from the front of the machine is a second driving gear 18. The rear end of shaft 13, as shown in Fig. 4, is provided with a square end 19 for the reception of a key whereby the spring may be wound from time to time for storing actuating energy in the meter. When the shaft 13 is operated by the key as stated, the gear 17 rotates with the shaft but as viewed in Fig. 12, the gear train normally operable by the gear 17, remains stationary during the winding operation by reason of the pawl and ratchet construction indicated by numerals 20 and 21 between a gear 22 (which is rotatably mounted on a shaft 23) and a gear 24 that meshes with and is driven by the gear 17. The principle of the described structure is well-known and its purpose is merely to enable the power unit to be wound without effecting the operation of the associated gear train which is operable by the gear 17 when it is actuated by the spring 15.

Figure 12:
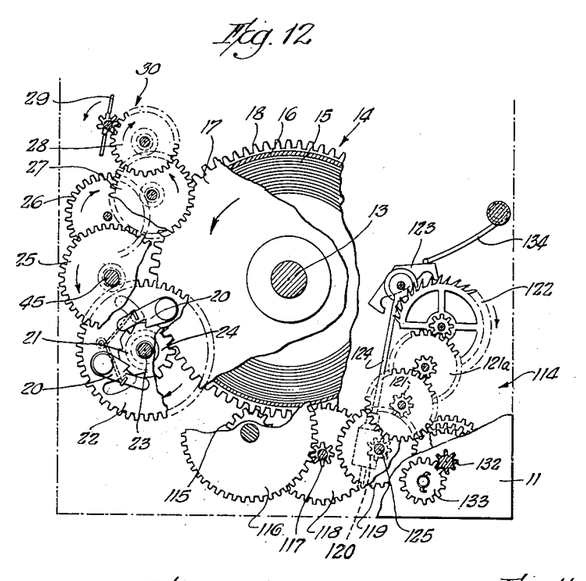
Fig. 12 is a broken elevational view illustrating two gear trains operable from a power unit, one of which actuates an indicating member during a parking period at a time-measuring velocity while the other train effects actuation of the signal and coin-handling mechanism.

As shown in Fig. 12 gear 22 is a part of a gear train comprising gears 25, 26, 27 and 28, the latter of which operates a vane or vane-like member 29 at relatively high velocity whenever the gear 17 is operated in a counter-clockwise direction as viewed in Fig. 12. The gear train just described is indicated generally by the numeral 30 and is the gear train from which power is derived for effecting the setting of an indicator member from a zero position to a position indicating the beginning of a parking period and for moving the signal member from a position wherein it indicates non-use of the meter or over-parking, to a position wherein a scale or scales are in operative association with the indicator and also provides power for effecting operation of coin-handling mechanism.

Figure 1:
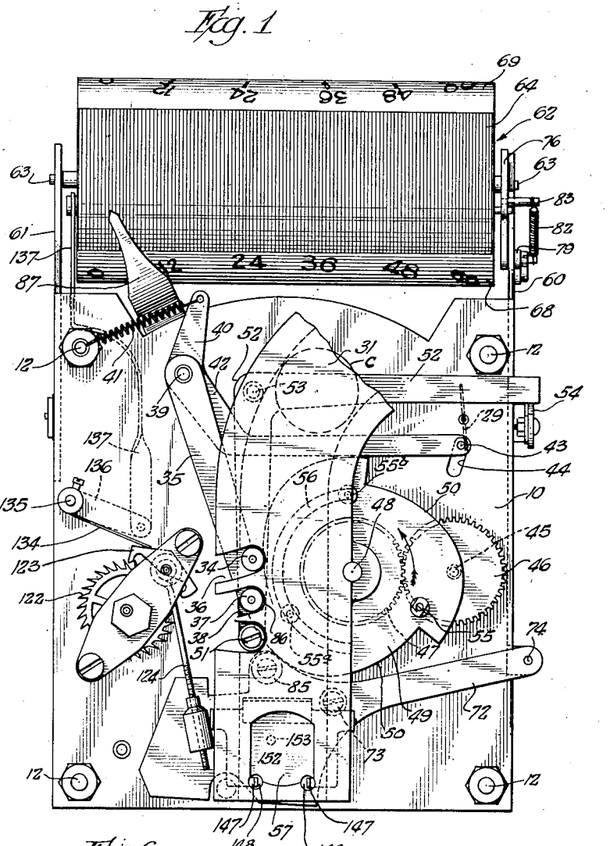
Fig. 1 is a broken front elevation of the parking meter mechanism removed from the casing.
Figures 11, 14, 15:
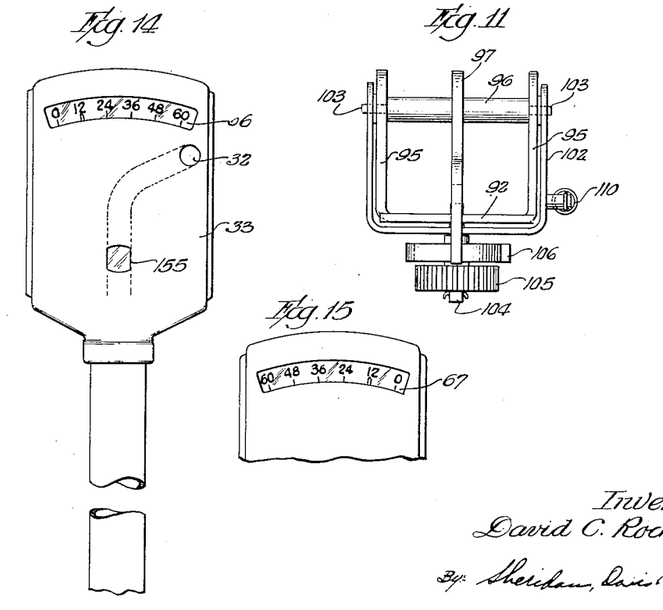
Fig. 11 is an enlarged sectional view taken on line 11—11 of Fig. 2.
Fig. 14 is a broken elevational view of a parking meter casing with the improved parking meter mechanism therein.
Fig. 15 is a broken elevational view illustrating the upper portion of the reverse side of the casing shown in Fig. 14.

As shown in Fig. 1 a coin chute 31 is secured to the front plate 10 in forwardly spaced relation with reference thereto and as indicated in Fig. 14 extends into communication with a coin-receiving opening 32 provided in the front of the casing 33 of the meter. Insertion of a coin, such as a 5¢ piece or a 1¢ piece for example, in the opening 32 effects energization of the meter, assuming it to have been in the non-operating position shown in Figs. 1 and 2. As such a coin descends through the coin chute 31 whether it be a smaller coin such as a 1¢ piece or a larger coin as a 5¢ piece, it strikes an upper roller 34 which is mounted upon a swingable arm 35 and which roller operates within a slot 36 which communicates with the coin passage of the chute. Two of such rollers and slots are provided, the lower roller being indicated by numeral 37 and the slot in which it operates being indicated by numeral 38. The lower roller 37 is also mounted upon the arm and serves to retain the arm 35 in the outwardly deflected position produced by the engagement of the rollers with the deposited coin. The arm 35 is pivotally mounted upon a stud 39 projecting forwardly from the front plate 10 and secured to which arm is an upwardly projecting extension 40 to which one end of a spring 41 is attached. The other end of the spring is shown attached to the extending end of one of the spacer members 12. The spring thus tends to swing the arm 35 counter-clockwise as viewed in Fig. 1 for retaining the rollers 34 and 37 in the positions shown in Fig. 1. Also secured to the arm 35 for swinging movement therewith is an arm 42, which extends between the chute 31 and the forward face of the plate 10, and is provided with an inwardly extending pin 43 which is arranged to operate within a slot 44 provided in the plate 10. The pin 43 constitutes a brake that normally extends into obstructing relation with the vane 29 and prevents rotation thereof and thus releasably holds the gear train 30 against operation.

When a coin, in traveling downwardly through the chute 31 engages the roller 34, it deflects the arm outwardly or clockwise as viewed in Fig. 1 against the action of spring 41 and thereby swings arm 42 and pin 43 downwardly. When in the downwardly moved position the pin 43 no longer obstructs the operation of the vane 29 whereupon the gear train 30 becomes operative.

Figure 2:
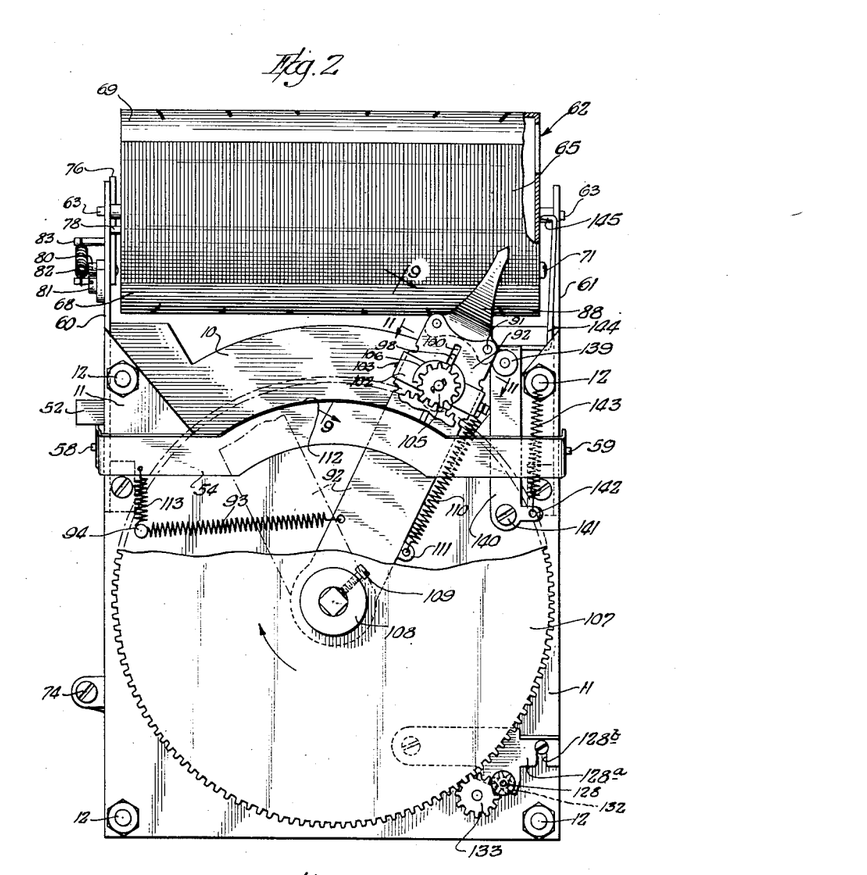
Fig. 2 is a rear elevational view of the metering mechanism.
Figure 3:
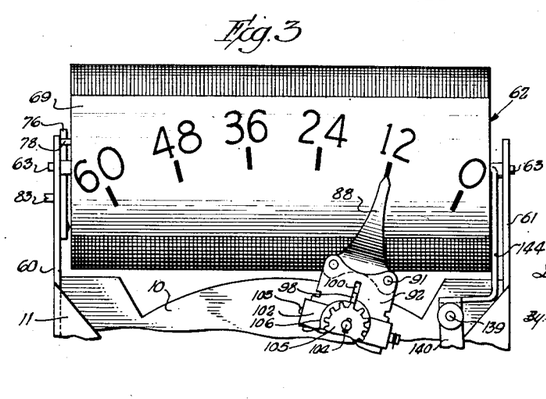
Fig. 3 is a broken elevation of the upper portion of the rear of the meter shown in Fig. 2 but with the indicator and associated signal member shown in different relative positions.

Referring to the gear train 30, it will be seen that the gear 25 is mounted on a shaft 45 which at its forward end carries a gear 46 which meshes with a gear 47. Gears 46 and 47 are mounted adjacent the forward side of the plate 10. Gear 47 is secured to a shaft 48 to which a cam 49 is secured and which is rotated counterclockwise by power derived from the spring driven gear 17 through the gear train 30. The cam 49 is provided with three cam surfaces each indicated by the numeral 50. As shown in Fig. 1, a roller 51 is mounted upon the depending arm of a bell crank lever 52 pivotally mounted at 53 to the plate 10 and having its second arm extend substantially horizontally to the right as viewed in Fig. 1 into engagement with the end of a swingable member 54. As shown in Fig. 1, the cam 49 is provided with three studs 55 projecting forwardly therefrom and these studs 55 are adapted to pass in succession through an arcuate slot 56 provided in the inner face of the chute 31 whereby the studs may project into the coin passage of the chute. As shown in said figure, one of the studs 55 is in position extending into the coin passage, said stud being indicated for the purpose of identification as 55a. Hence, a coin after displacing the rollers 34 and 37 to the left will be arrested in its movement by contact with the stud 55a but as the cam 49 begins to operate, stud 55a will move counterclockwise and will move out of the slot 56 while stud indicated by numeral 55b will move into the chute via slot 56 and engage the upper edge of a coin therein, the coin being indicated by the letter C, and force the coin downwardly through the chute and in so doing, deflect roller 51 to the left, thus swinging the bell crank lever 52 clockwise. The coin C in passing past the roller 51 drops through the chute where it is arrested in alignment with a sight opening 57, the coin-arresting means being hereinafter described. The cam 49, when released for operation by a coin, operates through an arc of 120° and hence, stud 55b, following the operation just above described, will come to rest in the position of stud 55a while the latter will then occupy the position of stud 55 and the latter will have moved into the position of stud 55b. The swinging movement of bell crank lever 52 as above mentioned actuates the member 54 which, as shown in Fig. 2, is generally of yoke shape and is coaxially pivoted at opposite ends at 58 and 59 to end plates 60 and 61, respectively, which are secured to the frame of the mechanism.

The side plates 60 and 61 constitute in effect parts of the frame of the structure and journalled in said plates is an oscillatable signal member indicated generally by the numeral 62. The particular form of the member shown in the drawing is provided with trunnions 63 at each end which are seated in apertures in the plates 60 and 61, and on its surface is provided (in the particular structure shown) with two horizontal bands 64 and 65 which are diametrically oppositely disposed. Each band embraces about 90° of arc of the circumference of the cylindrical surface of the member 62. In the drawing these bands are shaded to indicate the color red and when the mechanism is in the nonoperating condition, the bands are in alignment with the respective front and rear sight openings 66 and 67, respectively of the casing 33. The remaining portions of the surface of the cylindrical signal member 62 are occupied by two scales 68 and 69 bearing numerals indicating parking periods in minutes, or portions of such parking periods. In the drawings the dials 68 and 69 are graduated to indicate a maximum parking period of 60 minutes, the total period being divided into parking periods of 12 minutes duration each. Hence, where such dials are employed the maximum parking period accorded by the mechanism is one hour or 60 minutes which may be obtained by the insertion of a 5¢ piece or of five 1¢ pieces by the patron. In the event a shorter period is desired, such as 12, 24, 36 or 48 minutes, the requisite number of 1¢ pieces will be inserted in the machine. The insertion of any proper coin in the machine effects the movement of the signal member from the position wherein the signal bands 64 and 65 are in registration with the sight openings 66 and 67, respectively, to a position wherein the dials 68 and 69 register with said sight openings respectively as shown in Figs. 14 and 15.

The member 62 while centrally journalled is provided with an unbalancing weight 70 (see Fig. 5) which is mounted within the cylinder and secured in place by a screw 71 as shown in said figure. Hence, the normal position of the cylinder is that shown in Fig. 1 wherein the signal bands 64 and 65 register with the sight openings of the casing and thus indicate that the meter is not operating due to the expiration of the previously paid-for parking period.

When a coin, such as a coin C in Fig. 1, has been inserted in the coin chute 31 and has thrown the gear train 30 into operation by the outward deflection of the arm 35 as above described, the rotation of the cam 49 through the 120° arc of rotation thereof will effect actuation of a lever 72 which is pivotally mounted at 73 to the front plate 10 of the frame and effects the shifting of the member 62 from the position shown in Fig. 1 through an arc of 90° for effecting registration of the dials 68 and 69 with the front and rear sight openings 66 and 67, respectively, of the casing.

The lever 72 is pivotally connected at 74 with a vertically disposed bar 75 having a pin engageable member 76 at its upper end. The member 76 is provided with an arcuate face 77 to accommodate the movement of an outwardly extending pin 78 secured to the right hand end wall of the member 62 as viewed in Fig. 1, which curved face permits free swinging movement of the pin 78 from the upper dotted line position shown in Fig. 4 to the lower full line position shown in said figure, at the termination of each parking period, as will be explained later, the member 62 being moved by the counterweight 70 from the position shown in Fig. 14 wherein the dials register with the sight openings of the casing, to the position shown in Fig. 1 wherein the signal bands 64 and 65 register with said sight openings. The arm 72 and the bar 75 connected therewith are arranged to move the member 62 from the position shown in Figs. 1 and 4 through an arc of 90° for effecting registration of the dials with the casing sight openings whenever a coin is inserted in the machine at the beginning of a parking period.

As shown in Fig. 4, a guiding link 79 is pivotally connected at 80 to the bar 75 which pivot member 80 likewise connects the member 76 to the bar 75. The link 79 is pivotally connected at 81 to the side plate 60. Extending diagonally from the link to the member 76 is a tensioned spring 82. The spring 82 is attached to the member 76 by means of a stud 83 which also serves as a stop for limiting the clockwise swinging movement of the member 76 about the pivot 80 under the action of the spring. When the bar 75 is moved downwardly from the position shown in Fig. 4 by the swinging movement of the lever 72 as hereinafter described, the upper end 84 of the member 76 moves downwardly and to the right, under the guiding action of link 79, to a position beneath the level of the full line position of pin 78 and by reason of the guiding action of the link 79, moves under the pin for engagement therewith during the upward movement of the bar for thus effecting the rotation of the member 62 through an arc of 90°, and moving the pin 78 from the full line position shown in Fig. 4 to the upward dotted position.

The lower position of the member 76 is shown in dotted lines in Fig. 4.

When the cylinder 62 has been rotated as just described, it is latched in position against return movement to the former position under the action of the weight 70. The latching mechanism will be described later.

As shown in Figs. 1 and 4, the lever 72 is provided with a roller 85 which is engaged successively by the cam faces 50 of the cam 49. The normal position of the roller 85 with reference to any adjacent cam face while the cam 49 is not operating is shown in Fig. 1. When the cam begins to move counter-clockwise as shown in Fig. 1 by the mechanism previously described, the drop 86 between the cam surface 50 which contacts the roller 85 and the succeeding cam surface 50 permits the lever 72 to swing clockwise about the pivot 73 by reason of the weight of the bar 75 and link 79. The downward movement of the bar 75 thus afforded by the clockwise swinging movement of the lever 72 effects downward movement of the member 76 to enable the portion 84 thereof to move beneath the pin 78 as above described. The continued movement of the cam 49 cams the roller 85 counter-clockwise as viewed in Fig. 1 thus swinging the lever 72 in the same direction and moving the bar 75 upwardly whereby the pin-engaging portion 84 of the member 76 swings the member 62 through the 90° arc indicated in Fig. 4. Thus whenever a coin is inserted in the meter while the latter is in a non-operating condition, that is, when the signal bands 64 and 65 are visible through the sight openings of the casing, the ensuing 120° movement of the cam 49 permits operation of the lever 72 and member 76 to descend and the face 84 to engage beneath the pin 78 (then in the lowermost position). Continued movement of the cam through the remainder of the 120° movement swings the lever 72, bar 75 and member 76 upwardly and shifts the pin 78 to the upward position, thus moving the member 62 to cause the dials to register with the sight openings of the casing and indicating an operative condition of the meter. Upon completion of the movement of the cam 49 through the arc of 120°, the rollers 34 and 37 are permitted by the succeeding cam formation to be moved back into the position indicated in Fig. 1 by the spring 41 whereby the pin 43 is moved into blocking or braking contact with the vane 29 and thus interrupting the actuation of the gear train 30.

For cooperation with the respective dials 68 and 69 there is provided a pair of indicator members 87 and 88 visible at the front and rear sight openings 66 and 67 of the casing. As shown in Figs. 4 and 5, the indicators or pointers 87 and 88 are shown as being the terminal ends of an arcuate member 89 located beneath the member 62 and secured by a bracket 90 at 91 to a swingable arm 92 which is journalled for free swinging movement upon a cylindrical portion of the shaft 13 as viewed in Fig. 4. The arm 92 is arranged to be driven at a time-measuring velocity from a set position wherein the indicators 87 and 88, in association with the respective dials 68 and 69, indicate the beginning of a particular parking period. Thus if a 1¢ piece is inserted in the coin chute, the mechanism hereinafter to be described effects a swinging of the arm 92 to the right as viewed in Fig. 1 to a set position wherein the indicators indicate a 12 minute parking period. If additional 1¢ pieces are inserted, the arm is moved equivalent distances for each such coin and a correspondingly greater total parking period is indicated. If a 5¢ piece is inserted, the arm 92, in a single stroke moves from the position shown in Fig. 1 to the extreme right hand position wherein the indicators 87 and 88 register with 60 minute graduations on the dials.

As shown in Fig. 2 a spring 93 is attached to the arm 92 and to a stud 94 and tends to swing the arm counter-clockwise, as viewed in said figure, that is, from a position wherein the indicators 87 and 88 register with the zero graduations of the dials.

Latching mechanism is provided which normally restrains the swinging movement of the arm 92 by the spring 93. The latching mechanism is released however, by the rocking of the yoke-shaped member 54 by the clockwise movement of lever 52 (as viewed in Fig. 1) as previously described. As will be understood, the operation of lever 52 for releasing the latching mechanism for permitting the spring 93 to swing the indicator arm 92 from a zero position to a set position occurs during the interval of operation of the gear train 30, which, it will be recalled, is initiated by the deposit of a proper coin in the chute 31.

Figures 7, 8, 9, 10:
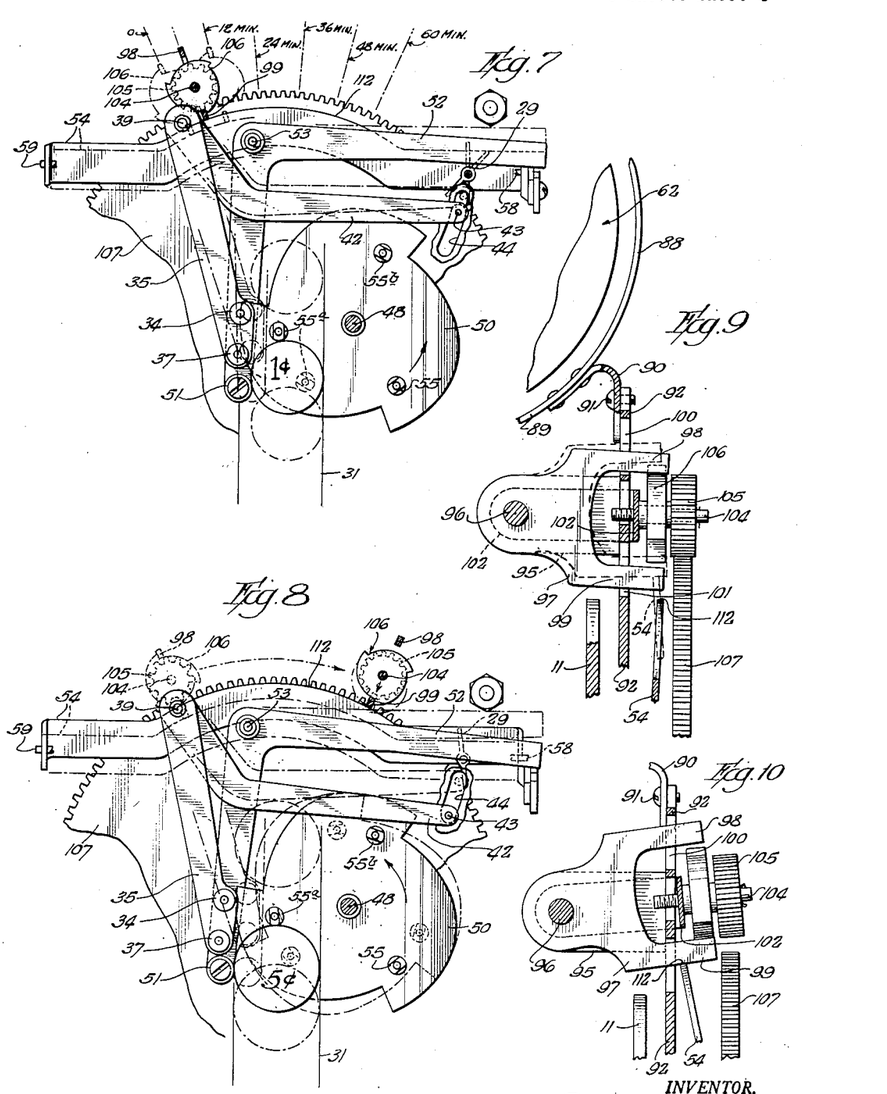
Fig. 7 is an elevational view illustrating operational relationship of a coin-actuated member to the indicator-setting mechanism and indicating the latter in different typical positions, the intervening mechanism being omitted for the purpose of clarity.
Fig. 8 is a view similar to Fig. 7 but illustrating the parts in an operational relationship resulting from the insertion of a proper coin of a diameter greater than those shown in Fig. 7.
Fig. 9 is an enlarged sectional view taken on line 9—9 of Fig. 2 and illustrating the operation of the indicator-setting mechanism when actuated in response to a coin of small diameter.
Fig. 10 is a view similar to Fig. 9 but illustrating the mechanism in a position resulting from the deposit of a larger coin.

As shown in Fig. 11, the arm 92 adjacent the upper end thereof is provided with a pair of rearwardly extending ears 95 in which is journalled a pin or shaft 96 which carries a latch member 97. The latch member 97 is provided with upper and lower fingers 98 and 99 (see Fig. 4) which extend forwardly through slots 100 and 101 provided therefor in the member 92. A U-shaped member 102 is pivotally supported by the ears 95, as upon the trunnions 103 of the pin 96, and rotatably supports a pin 104 which constitutes the axis of a gear member 105 and a three tooth ratchet member 106. The members 105 and 106 are attached together against relative rotation but are both rotatable upon the pin 104. The gear 105 is arranged in meshing relation with the teeth of a relatively large gear 107 which is rotatably mounted upon the shaft 13 and is secured in position by a collar 108 provided with a set screw 109. A spring 110 is attached to the U-shaped member 102 and to a lower portion of the arm 92, at 111, as shown in Fig. 2 and thus tends to hold the gear 105 in mesh with the gear 107. The fingers 98 and 99 of the latch member 97 extend one above and the other below the ratchet 106 and are spaced apart a distance such that by the movement of the member 97 alternately between the full line and the dotted line position shown in Fig. 9, teeth of the ratchet will engage the arms 98 and 99 alternately as the ratchet is rotated by the engagement of the gear 105 with gear 107 as the gear 105 moves from right to left, as viewed in Fig. 2, under the action of the spring 93. As shown in Fig. 2, the member 54 is provided with an arcuate surface 112 generated about the axis of the shaft 13 as a center. The member 54 normally is disposed below the lower finger 99 of the member 97 but when the member 54 is swung by the lever 52 as above described, the arcuate portion 112 of the yoke member 54 is moved upwardly into engagement with the lower surface of the finger 99 and hence will shift the member 97 arcuately in an upward direction. Due to the spacing of the three teeth of the ratchet 106 an arcuate distance 120° apart, the upward shifting of the finger 99 out of engagement with a tooth of the ratchet will permit the spring 93 to move the arm 92 to the left, as viewed in Fig. 2, until another of the teeth of the ratchet 106 engages the finger 99 which will then be moved upwardly slightly from the full line position shown in Fig. 9. Since the swinging movement of the arm to the left as viewed in Fig. 2, carries with it the gear 105, the latter being in mesh with the teeth of gear 107, will rotate thus causing the ratchet 106 to rotate and thereby bring a ratchet tooth into contact with the finger 99 as just described. When the yoke member 54 descends to the full line position, the latching member 97 will drop downwardly until the upper finger 98 contacts the upper surface of the ratchet 106 and the lower finger 99 moves out of obstructing position with a tooth of the ratchet. Thus the spring 93 will swing the arm 92 further to the left until the finger 98 is engaged by the next tooth of the ratchet. Such swinging movement of the member 97 can occur without upward swinging movement of the U-shaped member 102 and the movement just above described is brought about, in the mechanism shown, by reason of the relatively small size of a 1¢ piece when inserted in the coin chute 31. Thus when a 1¢ piece is forced downwardly by one of the studs 55 of the cam 49 it deflects the roller 51 to the left as viewed in Fig. 1 a distance sufficient to cause the lever 52 to swing member 54 pivotally through an arc which will rock the latch member 97 sufficiently to permit the spring 93 to swing the arm 92 to the left as viewed in Fig. 2 a distance to produce movement of the gear 105 about its axis through an arc of 120°, which is the arcuate distance between successive teeth of the ratchet. This movement of the gear 105 occurs in two steps of 60° each by reason of the coaction of the teeth of ratchet 106 with the fingers 98 and 99 as above explained and as illustrated in Fig. 7. Fig. 7 illustrates the deflection of arm 52 by a 1¢ piece at the front of the meter, the resulting elevation of the yoke 54 at the rear of the machine and the unlatching of the ratchet 106 by the fingers 98 and 99 in succession which permit the spring 93 to swing the indicator arm 92 (to the right as shown in Fig. 7 or to the left as shown in Fig. 2). During this movement of the arm 92, the gear 105 remains in mesh with gear 107 whereas when a 5¢ piece is inserted in the chute 31, the gear 105 is elevated out of mesh with gear 107 and the arm 92 is moved in a single stroke to the position indicating the maximum parking period as will be described in the next paragraph. The arm 92 is thereby permitted to move, under the action of the spring 93, to the left a distance sufficient to shift the indicators 87 and 88 from registration with the zeros on the respective dials into registration with the numerals 12. If a second 1¢ piece is inserted in the machine the indicators 87 and 88 will be moved, by the means described above, into registration with the numerals 24 on the respective dials. The insertion of successive 1¢ pieces thus produces step by step movement of the indicators along the dials corresponding to the number of coins inserted.

If a 5¢ piece is inserted in the coin chute 31 while the machine is in a non-operating position, that is, with the indicators 87 and 88 in the zero indicating position as shown in Figs. 1 and 2, the roller 51 will be deflected outwardly to a greater extent by reason of the greater diameter of the 5¢ piece and thus the arm 52 will be swung clockwise as viewed in Fig. 1 through a greater arc and consequently will swing the member 54 through a greater arc. The arcuate portion of the yoke member 54 will in that case move to the position shown in Fig. 10 and thus not only will swing the latch member 97 upwardly but will also swing the U-shaped member 102 upwardly against the action of spring 110 to a position wherein the gear 105 is out of mesh with the gear 107 whereupon the spring 93 will swing the arm 92 from the zero indicating position of Fig. 2 as shown in full lines, to the extreme left hand position wherein the indicators 87 and 88 will register with the 60 minute graduations on the dials. During such swinging movement of the arm 92, the arcuate surface 112 of the member 54 constitutes a track and retains the latch member 97, the member 102 and the gear 105 as well as ratchet 106 in the elevated position until the stroke of the arm 92 has been completed whereupon the 5¢ piece referred to will have passed out of engagement with the roller 51 permitting the lever 52 to return to the position shown in Fig. 1 and thereby permitting the member 54 to drop to its normal position under the action of spring 113 and thus restore the gear 105 into meshing engagement with the gear 107. As shown in Fig. 8, the gear 105 at the left of the figure is in mesh with gear 107. When the yoke shaped member 54 has been elevated by reason of the insertion of a 5¢ piece, the gear 105 is raised out of mesh with gear 107 and hence the arm 92 is swung by the spring 93 until the elevated gear 105 is in the right hand position shown in Fig. 8, which position corresponds to the setting of the indicators in the position indicating a parking period of maximum duration. When the indicators 87 and 88 have been moved into registration with the 60 minute graduations referred to or into registration with any of the other indicia on the dials indicating shorter parking periods, the gear 107 begins to rotate in a clockwise direction as viewed in Fig. 2 and thus begins to swing the arm 92 from the set position indicating the beginning of a parking period, back toward the full line position shown in said figure. The movement of the gear 107 swings the arm 92 by reason of the latched relationship between them effected by the meshing of gear 105 with gear 107 and the engagement of a tooth of ratchet 106 with the finger 98 of the member 97.

Figure 13:
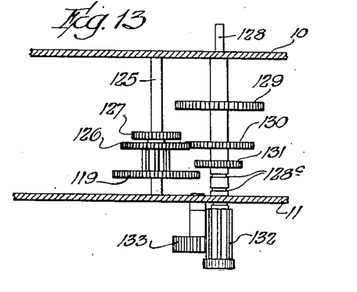
Fig. 13 is a sectional view taken approximately on line 13—13 of Fig. 5.

The gear 107 is operable by a timing gear train indicated generally by the numeral 114 in Fig. 12. This train comprises a gear 115, which meshes with the spring driven gear 18, and comprises also the gears 116 to 121, inclusive. Gear 121a, driven by gear 121, drives an escapement mechanism of conventional construction which comprises a ratchet wheel 122 and an escapement dog or pawl 123 depending from which is a pendulum 124. The gear 119 is mounted on a shaft 125 on which are also mounted, as shown in Fig. 13, gears 126 and 127. Adjacent the shaft 125 is mounted a slidable shaft 128 which carries gears 129, 130 and 131, to be later described in greater detail. The shaft 128 at its rear end carries a pinion 132 having elongated teeth which mesh with a gear 133 which, as shown in Fig. 2, meshes with the gear 107 for driving the latter in a clockwise direction as viewed in the latter figure. Hence, when the gear train 114 is operated by the gear 18, the gear 107 is rotated at a timing speed under the control of the escapement mechanism described for swinging the arm 92 from a set position toward the zero position shown in full lines in Fig. 2. The movement of the arm 92 and consequently of the indicators 87 and 88 is at a rate to move from one extreme position to the other along the dials in 60 minutes (in the mechanism shown), or from any other set position to the zero position in the number of minutes indicated by the graduation of the set position. The timing train 114 is held inoperable except during the parking period following the insertion of a coin and at the termination of each parking period, the train is rendered inoperative for thereby conserving the stored up energy of the clock mechanism or other power unit.

The means for interrupting the operation of the timing train 114 comprises a damper or brake member 134 which, as shown in Figs. 1 and 12, is adapted to be swung into contact with the pawl 123 to arrest its oscillating movement and thereby interrupt the movement of the ratchet 122. The damper or brake 134 is attached to a short oscillating shaft 135 journalled in the front plate 10. The inner end of the shaft 135 is secured to an arm 136 which at its other end is secured to a link 137 which at its upper end is pivotally secured as at 138 eccentrically to the end of the cylindrical member 62 as shown in Fig. 5.

As previously described, the member 62, by reason of the counter-weight 70, is returned to the position shown in Fig. 1 at the termination of each parking period. In Fig. 5, the member 62 is shown in the same relative position as in Fig. 1 and as shown in said Fig. 5, member 137 is in a lowered position corresponding to that shown in Fig. 1. In Fig. 1, it will be seen that the brake 134 is in contact with the pawl 123 thus holding the gear train 114 against operation. When the member 62 has been moved from the position shown in Fig. 1 through an arc of 90° for displaying the dials through the respective casing sight openings, the pivotal connection 138 will be moved to the dotted line position shown in Fig. 5, thus raising the link 137 and thereby raising the arm 136 and lifting the brake 134 out of contact with the ratchet 123 and releasing the escapement mechanism of gear train 114 for effecting movement of the gear 107 in a clockwise direction as viewed in Fig. 2. As the gear 107 moves clockwise, it carries with it the arm 92 since the gear 105 is in mesh with gear 107 and is restrained against rotation with respect to gear 107 by reason of the engagement of the upper finger 98 of the latch member 97 with one of the teeth of the ratchet 106 as indicated in Fig. 7. Hence during any parking period following the deposit of a proper coin in the meter, the gear train 114 drives the gear 107 and gear 107 swings with it the arm 92 and indicators 87 and 88 by reason of the latching engagement between the arm 92 and gear 107 afforded by the latch member 97, ratchet 106 and gear 105.

As mentioned above, shaft 128 can be shifted transversely of the frame, that is, forwardly or rearwardly as viewed in Fig. 13. Gear 130 is shown in meshing relation with gear 126. The ratio of gears 126 and 130 is such that gear 133 drives gear 107 at a rate to swing the arm 92 and thus the indicators 87 and 88 from the maximum or 60 minute parking period back to zero in one hour. By shifting the shaft 128 forwardly, gear 130 will be moved out of meshing engagement with gear 126 and gear 131 moved into meshing engagement with gear 119 whereupon the driving ratio of the gear 107 will be changed so that the indicators 87 and 88 will move the full length of the dial in a shorter period of time, for example, one half hour. By further shifting of the shaft 128 forwardly, gear 131 will be moved out of meshing engagement with gear 119 and gear 129 will be moved into meshing engagement with gear 127. The ratio of gear 127 to 129 is such that the velocity of operation of gear 107 will be reduced so that the indicators 87 and 88 will move the full length of the dial back to zero position in a greater period of time, for example, two hours. It will therefore be seen that for changing the meter of the described construction for a one-half hour maximum parking period, it is only necessary to place appropriate dials on member 62 and shift the shaft 128 to bring gear 131 into driven contact with gear 119, whereas, if a two hour maximum parking period is desired, appropriate dials are installed and the shaft 128 shifted to bring gear 129 into driven engagement with gear 127. For the purpose of retaining shaft 128 in any one of the shifted positions referred to, a latch member 128ᵃ is shown (see Fig. 2) pivotally connected to the plate 11 and provided with an open slot 128ᵇ therein adapted to be swung downwardly into latching relation with any one of the three annular grooves 128ᶜ provided in the shaft 128 for retaining the shaft 128 against displacement from an adjusted position.

When, at the end of any parking period, the arm 92 has been moved by the gear 107 back to zero position as indicated in full lines in Fig. 2, the upper portion of the arm engages a roller 139 mounted on an arm 140 which is pivotally secured at 141 to the rear plate 11. The arm 140 is shown provided with a short extension 142 to which is secured one end of the tension spring 143, the upper end of which is secured to the projecting end of one of the spacer members 12. The spring tends to swing the arm 140 counter-clockwise as viewed in Fig. 2. Extending laterally from the upper end of arm 140 is an arm 144 which terminates at its upper end in a hook 145 which normally is slightly spaced from the adjacent end of the signal member 62 as shown in said figure. The adjacent end of the cylinder 62 is provided with a slot 146 as shown in Fig. 5, into which the hook 145 extends when the cylinder has been rotated to a position to expose the dials 68, 69 through the sight openings 66, 67 respectively, that is, when the member 62 has been moved through an arc of 90° counter-clockwise as viewed in Fig. 5. When the cylinder is so operated, the slot 146 will be in the dotted line position indicated in Fig. 5 and into said slot the hook 145 will be moved by the spring 143 to retain the cylinder against return movement under the action of the weight 70. As above described the movement of the cylinder 62 just referred to, is effected by the operation of lever 72 which causes the end 84 of the member 76 to engage the pin 78 to swing the latter from the full line position in Fig. 4 to the dotted line position. As the cylinder reaches the end of the movement imparted thereto by the lever 72, the hook 145 moves into the slot 146 at the other end of the cylinder and thus retains the cylinder in the position wherein the dials are visible through the sight openings of the casing. The spring 143 is able to swing the hook 145 into the latching position mentioned since during the rotation of the cylinder at the beginning of a parking period, the member 54 will have been swung as above described to release the arm 92 for movement of the indicators 87 and 88 from the zero position to a position indicating the beginning of a parking period and such movement of the arm 92 releases roller 139 to enable the spring 143 to swing the hook 145 into the slot 146. When the arm 92 has been restored to the full line position shown in Fig. 2, by the rotative movement of gear 107 as above described, the arm 140 will be swung clockwise against the action of the spring 143, the hook 145 will have been withdrawn from the slot 146 and the cylinder 62 will be rotated by the weight 70 to move the dials 68 and 69 out of registration with the sight openings of the casing and cause the signal bands 64 and 65 to register with said openings, thus indicating termination of the parking period.

As stated above, when a coin has been dropped into the chute 31 and has deflected the lever 35 clockwise as viewed in Fig. 1, for removing the brake 43 from obstructing relation with respect to the vane 29 and thereby permitted the gear train 30 to become operative for effecting operation of the cam 49 to cause one of the studs 55 of the cam to force the inserted coin downwardly into engagement with the roller 51 and past said roller, the coin is arrested in a position aligned with the coin inspection opening 57. The coin is arrested in registration with said opening 57 by a pair of fingers 147 which project into apertures 148 provided in the chute 31. The fingers 147 are carried by a swingable plate 149 (see Fig. 4) which is provided with a pair of ears 150 pivotally mounted at 151 to opposite edges of the coin chute 31. The upper end of the plate 149 is provided with a downwardly turned end having a horizontal edge 152 which is adapted to be engaged by a stud 153 projecting forwardly from the lever 72 at the left hand side of the pivot 73. Thus when the lever 72 moves clockwise as above described, the pin 153 moves arcuately upwardly and engages the end 152 and swings the coin-arresting plate 149 counter-clockwise as viewed in Fig. 4 for effecting the withdrawal of the fingers 147 from the apertures 148. A coin in arrested position with reference to the opening 57 will thus be released from said position and will drop from the coin chute into a coin receptacle (not shown) within the meter casing. The counter-clockwise swinging movement of the coin arrestor effected by the engagement thereof by pin 153, is resisted by a spring member 154 which may be formed integrally with the plate 149 and hence as the pin 153 moves out of engagement with the end 152 of the plate, the spring 154 swings the plate to the position shown in Fig. 4, wherein the fingers are in coin arresting position. Hence as an inserted coin is being moved downward by one of the studs 55 of the cam 49 past the roller 51, the pin 153 effects release of a previously inserted coin held in visible relation by the coin arrestor while the spring 154 restores the fingers 147 to the slots 148 for arresting in visible relation the last inserted coin. Hence during any parking period the last coin inserted in payment for such period is retained during such period in position where the same is visible through a glazed window 155 provided in the casing 33 of the meter.

While I have shown and described preferred mechanism that is automatically operative to indicate and measure a parking period of a duration correlative to the denomination (diameter) of the deposited coin and which becomes inoperative upon the termination of each successive parking period, it will be apparent that various changes in the detailed structure illustrated may be utilized without departure from the scope and spirit of the invention.

I claim:

1. In a parking meter, power means comprising a timing gear train and a mechanism-actuating gear train, said gear trains being independently operable by said power means, a parking period indicating dial, an indicator movable relative to said dial from a zero position to a set position for indicating the beginning of a parking period and operable in the opposite direction by said timing gear train at a time-measuring velocity from said set position to said zero position, means actuated by the mechanism-actuating gear train for effecting movement of the indicator from the zero position to the set position, releasable brake means retaining said actuating train against operation, releasable damper means for interrupting the operation of said timing gear train, means actuatable in response to actuation of the mechanism-actuating gear train for effecting the release of said damper to a position for permitting the operation of said timing train, releasable latch means for coupling said indicator to said timing gear train, said latch means being releasable in response to the actuation of the mechanism-actuating gear train to permit the movement of the indicator from the zero position to the set position, coin operable means for releasing said brake means whereby said actuating gear train effects movement of said indicator from said zero position to said set position and effects release of said damper for releasing said timing train for actuation of said indicator from said set position to said zero position, and means actuatable by said indicator upon restoration to said zero position for effecting the return of said damper to a position for interrupting the operation of said timing train.

2. A parking meter comprising a movable signal member provided with a signal for indicating the expiration of a parking period and a second signal indicating the non-expiration of a parking period, said member being movable for effecting the display of said signals alternately to a signalling position, power means comprising two independently operable drive members, an indicator movable relative to said signal member from a position indicating the expiration of a parking period to a position indicating the beginning of the next subsequent parking period and movable in the opposite direction at a time measuring velocity for indicating the lapse of time during said last mentioned parking period, driven mechanism operable by one of said drive members for effecting the movement of said signal members and said indicator from the respective first mentioned to the respective second mentioned positions, timing mechanism operable by the other of said drive members for actuating said indicator at said time measuring velocity, releasable brake means for retaining said driven mechanism against operation, damper means for interrupting operation of said timing mechanism, releasable latch means coupling one of said drive members with said indicator, coin actuatable means for effecting the release of said brake and said latch means for initiating the actuation of said driven mechanism for moving said signal member and said indicator from the respective first mentioned positions to the respective second mentioned positions, means operable by said signal member in moving to said second mentioned position for releasing said damper for effecting actuation of said timing mechanism for moving said indicator from said second to said first mentioned position, and means actuatable by said indicator upon restoration to said first mentioned position for effecting restoration of said signal member to said first mentioned position and for effecting the return of said damper to position for interrupting the actuation of said timing mechanism.

3. In a parking meter, a power unit comprising a pair of drive members operable thereby, a parking period indicator comprising an arm swingable from a zero position to a position for indicating the beginning of a parking period, timing mechanism actuatable by one of said drive members and comprising a driven gear for operating said arm from a set position to said zero position at a time measuring velocity, a second gear carried by said arm and normally meshing with said driven gear, means for releasably latching said second gear against rotation relative to said first gear whereby rotation of said first gear effects said swinging movement of said arm at a time-measuring velocity, normally inoperative actuating means operable by said other drive member for releasing said second gear momentarily from latched relation with respect to said first gear, coin actuated means for rendering said actuating means operative, and means for swinging said arm from said zero position to a set position during the period of the unlatched relation to said gears.

4. In a parking meter, a swingable indicator comprising a pivotally mounted arm, means biasing the arm for swinging movement from a zero indicating position to a set position indicating the beginning of a parking period, a power unit, a gear driven thereby in one direction, a second gear adapted to mesh with said first gear, means mounting said second gear on said arm for swinging movement of said second gear out of meshing relation with said first gear, normally inoperative actuating mechanism driven by said power unit for swinging said second gear out of meshing engagement with said first gear whereby said biasing means can swing said arm from said zero position to a set position, and coin controlled means for rendering said actuating mechanism operative by said power unit.

5. In a parking meter, a power unit, a gear operable thereby in one direction, means associated with said gear for controlling its rotation at a time-measuring velocity, an indicator comprising a swingable arm concentrically mounted with respect to said gear, a second rotatable gear mounted on said arm in mesh with said first gear, means biasing said arm for swinging movement from a zero indicating position to a position indicating the beginning of a parking period, means for latching said second gear against movement relative to said first gear by said biasing means whereby said arm is operable by said first gear at a time-measuring velocity for moving said indicator from a set position to said zero position, and normally inoperative actuating means driven by said power unit for effecting the release of said second gear from said first gear for enabling said biasing means to swing said arm from a zero indicating position to a position indicating the beginning of a parking period, said actuating means comprising a member responsive in degree of movement to the diameter of a coin deposited in the meter, and said latter member cooperating with said latching means for correspondingly moving the latching means to control the degree of swinging movement of said arm by said biasing means, whereby the indicated parking period is of a duration correlative to the diameter of the deposited coin.

6. In a parking meter, a power unit, a swingable parking period indicator, a gear drivable by said unit at a time-measuring velocity, means for latching said indicator to said gear for movement by said gear at a time-measuring velocity from a set position indicating the beginning of a parking period to a zero position indicating the expiration of a parking period, coin controlled mechanism drivable by said power unit for effecting the release of said latching means and effecting movement of said indicator relative to said gear from said zero position to a set position, means arresting driven movement of said gear when said indicator is in said zero position, and means rendering said arresting means inoperative upon movement of said indicator to a set position.

7. In a parking meter, a power unit, a gear drivable thereby, means associated with said gear for controlling its rotation at a time measuring velocity, an indicator movable from a zero position to any one of several set positions indicating the beginning of parking periods and vice versa, a second gear, means mounting said second gear on said indicator normally in mesh with said first gear, means normally latching said second gear against rotation relative to said first gear whereby driven movement of said first gear effects concurrent movement of said second gear and imparts movement of said indicator at a time measuring velocity from a set position to said zero position, means for moving said indicator and second gear in the opposite direction relative to said first gear upon release of said latching means, said latching means being actuable to different positions to permit movement of the second gear relative to the first gear in different amounts depending on said position of the latching means, and coin controlled means responsive to deposited coins of different diameters for so actuating said latching means to said different positions, including one position for disengaging said second gear from said first gear, as to permit movement of said indicator by said indicator moving means from said zero position to a set position indicating the beginning of a parking period of a duration correlative to the diameter of the deposited coin or coins.

8. In a parking meter, a casing provided with a sight opening, a signal member in the casing provided with a dial for indicating the operation of the meter and provided with a warning portion for indicating the non-operation of the meter, said signal member being movable within the casing for effecting the alternate registration of said dial and warning portion with said sight opening, a power unit in the casing, an indicator having a portion visible through said sight opening and movable from a zero position on the dial to any one of several positions thereon indicating the beginning of a parking period, biasing means for moving said indicator from a zero position to a set position, driving means operable by said power unit for moving said indicator at a time-measuring velocity from a set position to said zero position, driven means operable by said unit upon initial actuation thereof following the deposit of a coin and responsive to the diameter of the coin for permitting the movement of said indicator by said biasing means from a zero position to a set position indicating the beginning of a parking period, said driven means comprising means effective to disengage said indicator from said driving means for movement relative to the dial correlative to the diameter of the deposited coins whereby said set position is indicative of a parking period of a duration predetermined by the coin diameter, means actuatable by a coin deposited in the meter for rendering said power unit active for actuating the initial operation of said driven means, means operable by said driven means for effecting the movement of said signal member to render said dial visible through said sight opening, means moving said warning portion to position for indicating non-operation of the meter upon movement of said indicator to zero position, and means for interrupting the operation of the driving means upon movement of said signal member to said last named position, said interrupting means being effective to retain said driving means inactive when the warning portion of the signal is visible through the sight opening.

9. In a parking meter, a power unit, a signal member movable alternately to positions indicating operative and non-operative conditions of the meter, a movable parking period indicator separate from said signal member, a first driven means operable by the power unit for actuating said indicator from a set position indicating the beginning of a parking period to a zero position indicating the expiration of a parking period, means operable in response to movement of said indicator to zero position for moving said signal member from operative to non-operative position, brake means normally retaining said driven means inoperative, a second driven means operable by said unit independently of said first driven means, mechanism operable by said second driven means for moving said signal member from non-operative to operative position, a second brake means normally biased in a direction for retaining said mechanism inoperative, a coin displaceable member actuatable by a coin deposited in the meter for releasing said second brake means of said mechanism for initiating operation of the latter by said second driven means, said mechanism comprising a rotatable member for retaining said displaceable member in displaced relation for a predetermined interval, means operable by said mechanism and responsive to the diameter of a deposited coin for effecting the movement of said indicator from a zero position to a set position indicating the beginning of a parking period correlative to the diameter of the deposited coin, and control means operable in response to actuation of said second driven means for releasing said brake means of said first driven means and operable in response to movement of said signal member from operative to inoperative position for effecting the resetting of the last-mentioned brake means to arrest operation of said first driven means upon movement of the indicator to said zero position.

10. In a parking meter, a power unit, a signal member movable alternately to positions indicating operative and non-operative conditions of the meter, an indicator, a first means driven by the power unit for actuating the indicator at a time-measuring velocity relative to the signal member toward a zero position during periods that the signal member indicates an operative condition of the meter, including a gear drivable by said power unit, a second gear carried by said indicator normally in mesh with the first gear, and means normally latching said second gear against rotation relative to said first gear for effecting said movement of said indicator toward zero position; means biasing said indicator for movement from zero position, a second driven means operable by the power unit for moving said signal member at the beginning of a parking period to a position to indicate an operative condition of the meter and for releasing said indicator momentarily from the said first driven means to effect the setting of said indicator to a set position initially indicating the duration of a parking period, including means for momentarily unlatching said latching means to permit movement of said indicator to the set position by said biasing means; means for terminating the operation of said second driven means upon the setting of said indicator in a parking period indicating position, means rendered operative in response to the return of said indicator to zero position for actuating said signal member at the termination of a parking period to a position indicating the non-operative condition of the meter, and means operable by said signal member upon the last named movement thereof for arresting the operation of said first driven means.

11. In a parking meter, a power unit, a pair of gear trains actuatable thereby, an indicator operable in one direction by a first one of said gear trains and having means associated therewith for moving said indicator at a time measuring velocity, a gear drivable by said one gear train, a second gear carried by said indicator normally in mesh with the first gear, said gears comprising part of said first gear train, a brake for arresting actuation of the second train, coin handling mechanism actuatable by said second gear train, a coin displaceable member for releasing said brake for effecting actuation of said second gear train and thereby effecting the actuation of said coin handling mechanism, means biasing said indicator for movement from a zero position to a set position indicating the beginning of a parking period, means normally latching said second gear against rotation relative to said first gear for latching said indicator in zero position, means operable by a coin carried by said coin handling mechanism for effecting the momentary release of said latching means whereby said biasing means moves said indicator to a set position for subsequent movement in the opposite direction by said first gear train at a time measuring velocity, and means comprising a member actuatable by said indicator upon arrival at zero position for arresting operation of said first gear train.

12. In a parking meter a timing gear operable in one direction, an arcuately movable indicator arm mounted coaxially with respect to said timing gear, means releasably securing said indicator arm to said timing gear for movement by the latter from a set position indicating the beginning of a parking period to a zero position, means biasing said arm for movement in a direction from zero position to a set position, said securing means comprising a second gear carried by said arm in meshing engagement with the teeth of said timing gear and means for latching said second gear against movement relative to said timing gear under the action of said biasing means, and means for releasing said latching means whereby said indicator arm and second gear are movable by said biasing means from a zero position to a set position independently of said timing gear.

13. In a parking meter, a timing gear operable in one direction, an arcuately movable indicator arm mounted coaxially with respect to said timing gear, means releasably securing said indicator arm to said timing gear for movement by the latter from a set position to a zero position, means biasing said arm for movement from zero position to any of several set positions indicating parking periods of different durations, said securing means comprising a second gear, means shiftably securing said second gear to said arm for movement into and from meshing engagement with said timing gear and pawl and ratchet means normally latching said second gear against movement relative to said timing gear under the action of said biasing means, and a coin responsive mechanism operable by a coin of one diameter for actuating said shiftable means for moving said second gear out of meshing engagement with said timing gear whereby said biasing means can swing said arm to a set position indicating a parking period of a given duration and operable by a coin of a different diameter for releasing said pawl and ratchet means to enable said biasing means to move said indicator arm to a set position indicating a parking period of a different duration.

14. In a parking meter, a power unit, a first and second gear trains independently operable by said unit, means associated with said first gear train for controlling its rotation at a time measuring velocity, brake means for each train for arresting operation thereof, a parking period indicator operable by said first gear train from a set position to a zero position at a time measuring velocity, means biasing said indicator from said zero position toward a set position, a coin receiver, a member displaceable from a given position by a coin deposited in the receiver for releasing the brake means of said second gear train for initiating the operation of the latter, means operable by said second gear train for retaining said brake release member in displaced position for a predetermined interval, means for restoring said displaceable member to original position for re-setting said brake means and arresting operation of said second gear train upon expiration of said operating interval, means operable by said second gear train during said interval of operation to move a coin from said receiver, means operable by said last recited means for effecting operation of said biasing means to cause the movement of said indicator in response to the movement of said coin to a set position indicating the beginning of a parking period, an operable signal member movable from a first position indicating expiration of a parking period to a second position indicating non-expiration of a parking period, a second biasing means for biasing said signal member for movement to the first-named position, means operable by said signal member in moving to said first-named position for re-setting the brake means of said first gear train and for releasing said brake means in moving from said first-named position, means operable by said second gear train for moving said signal member to said second-named position and thereby indicating the operation of said first gear train, means for latching said signal member in said second-named position, and mechanism operable by said indicator upon movement thereof to said zero position for effecting the release of said latching means for enabling said second biasing means to return said signal member to said first-named position and thereby effect the re-setting of the brake means of said first gear train.

15. In a parking meter, a casing provided with a sight opening, a power unit in said casing, a driven member operable by said unit, a movable signal member comprising a portion indicating the expiration of a parking period and a dial portion indicating non-expiration of a parking period, said portions of said signal member being arranged for alternate registration with said sight opening, an indicator having a pointer movable along said dial from a set position to a zero position for measuring a parking period when said dial is in registration with said sight opening, mechanism operable by said driven member, means operable by said mechanism for effecting the moving of said signal member to a position wherein said dial registers with said sight opening, means actuatable by a coin deposited in said meter for effecting actuation of said mechanism by said driven member, coin responsive means operable by said mechanism for effecting the movement of said indicator to a position indicating on said dial the beginning of a parking period of a duration correlative to the diameter of the deposited coin, a second driven member operable by said power unit, means actuatable by said second driven member for operating said indicator from said set position to said zero position at a time measuring velocity, means for effecting the movement of said signal member to the position indicating the expiration of a parking period upon movement of said indicator to said zero position and means operable upon the arrival of said indicator at said zero position for interrupting the operation of said second driven member.

16. In a parking meter, a power unit, a driven gear, a parking period indicator arm coaxially mounted with respect to said gear, means latching said arm to said gear for movement thereby through a given range, a pinion driving said gear, and means driven by said unit operatively disposed between said power unit and pinion for operating the latter, said means comprising shiftable transmission mechanism selectively operable to any one of a plurality of positions for effecting the operation of said indicator at a velocity determining the duration of a selected parking period.

17. In a parking meter, means for receiving deposited coins of different diameters, a power unit, coin handling means drivable by said power unit to move a coin from a certain position in said coin receiving means, an indicator movable from a zero position to a set position indicating the beginning of a parking period, a gear operable by said power unit, a second gear carried by said indicator normally in mesh with the first gear, means normally latching said second gear against rotation relative to said first gear for latching the indicator in a zero position, said latching means being unlatchable to different extents to permit movement of the second gear and indicator in different amounts, means actuatable by a deposited coin for initiating driving movement of said coin handling means by said power unit, means operable by a coin moved by said coin handling means for unlatching the latching means to an extent correlative to the diameter of the coin for unlatching the latching means momentarily to permit movement of said indicator from said zero position to a set position indicating the beginning of a parking period correlative to the coin diameter, and means for moving said indicator to said set position.

DAVID C. ROCKOLA.

REFERENCES CITED

The following references are of record in the file of this patent:

UNITED STATES PATENTS

| Number | Name | Date |
|---|---|---|
| 2,118,318 | Magee | May 24, 1938 |
| 2,137,111 | Hale et al. | Nov. 15, 1938 |
| 2,284,221 | McGay | May 26, 1942 |
| 2,329,926 | Michaels | Sept. 21, 1943 |